(12) United States Patent
Fauconet et al.

(10) Patent No.: US 12,371,353 B2
(45) Date of Patent: Jul. 29, 2025

(54) ELIMINATION OF FORMALDEHYDE IN WASTEWATER THROUGH OXIDATION TREATMENT

(71) Applicant: Arkema France, Colombes (FR)

(72) Inventors: Michel Fauconet, Saint Avold (FR); Gullu Isik, Saint Avold (FR)

(73) Assignee: Arkema France, Puteaux (FR)

( * ) Notice: Subject to any disclaimer, the term of this patent is extended or adjusted under 35 U.S.C. 154(b) by 610 days.

(21) Appl. No.: 17/633,994

(22) PCT Filed: Aug. 18, 2020

(86) PCT No.: PCT/FR2020/051477
§ 371 (c)(1),
(2) Date: Feb. 9, 2022

(87) PCT Pub. No.: WO2021/038159
PCT Pub. Date: Mar. 4, 2021

(65) Prior Publication Data
US 2022/0267179 A1 Aug. 25, 2022

(30) Foreign Application Priority Data

Aug. 28, 2019 (FR) ..................................... 19.09477

(51) Int. Cl.
*C02F 1/72* (2023.01)
*C02F 1/04* (2023.01)
*C02F 101/34* (2006.01)

(52) U.S. Cl.
CPC .............. *C02F 1/722* (2013.01); *C02F 1/048* (2013.01); *C02F 2101/34* (2013.01)

(58) Field of Classification Search
CPC ...... C02F 1/722; C02F 1/048; C02F 2101/34; C02F 2103/36; Y02W 10/10
See application file for complete search history.

(56) References Cited

U.S. PATENT DOCUMENTS

| 5,545,336 A | 8/1996 | Wheeler et al. |
| 10,093,551 B2 | 10/2018 | Hammon et al. |

(Continued)

FOREIGN PATENT DOCUMENTS

| AU | 2012359295 A1 | 9/2013 | |
| DE | 102015115916 A1 * | 3/2016 | ........... B01D 1/0058 |

(Continued)

OTHER PUBLICATIONS

Chinese—NPR—Non-Translation Version Management Technologies of Organic Water Contamination—Apr. 30, 1989—pp. 126-127; Xikang Wu et al, East China University of Chemical Technology Press.

(Continued)

*Primary Examiner* — Waqaas Ali
(74) *Attorney, Agent, or Firm* — Debodhonyaa Sengupta

(57) ABSTRACT

The present invention relates to a process for the treatment of wastewater containing formaldehyde. In particular, the invention relates to a process for the treatment of liquid effluents resulting from the manufacture of acrylic acid or acrolein, which is targeted at removing the formaldehyde present in these effluents. Finally, the invention relates to the use of the purified aqueous solution thus obtained in process for the production of acrylic acid by catalytic oxidation of propylene and/or propane.

15 Claims, 1 Drawing Sheet

(56) References Cited

U.S. PATENT DOCUMENTS

2012/0302797 A1    11/2012   Devaux et al.
2016/0083267 A1     3/2016   Hammon et al.

FOREIGN PATENT DOCUMENTS

| GB | 1495339 | | 12/1977 | | |
|---|---|---|---|---|---|
| GB | 1495339 | A * | 12/1977 | .............. | C02F 1/722 |
| JP | H01262981 | A | 10/1989 | | |

OTHER PUBLICATIONS

Chinese—NPR—Translation Version Management Technologies of Organic Water Contamination—Apr. 30, 1989—pp. 126-127; Xikang Wu et al, East China University of Chemical Technology Press.
2010 International Conference on Challenges in Environmental Science and Computer Engineering; "Study on the Treatment of Formaldehyde Wastewater by Addition Reaction"; CHEN Yu., et al. pp. 293-296.
J. Phys. Chem A 2005, 109, pp. 283-288; "Complex Behavior in the Formaldehyde—Sulfite Reaction" Kovacs k., et al.
Environmental Engineering Science; vol. 20 No. 6 (2003) Mary Ann Liebert, Inc. Technical Note "Removal of Formaldehyde from Acrylic Acid Production Wastewater"; V. Bednarik & M. Vondruska; pp. 703-707.
Environmental Technology (2014) vol. 35, No. 7, pp. 907-916—"Supercritical Water Oxidation of Acrylic Acid Production Wastewater"; Y.M. Gong et al.

\* cited by examiner

[Fig.1]
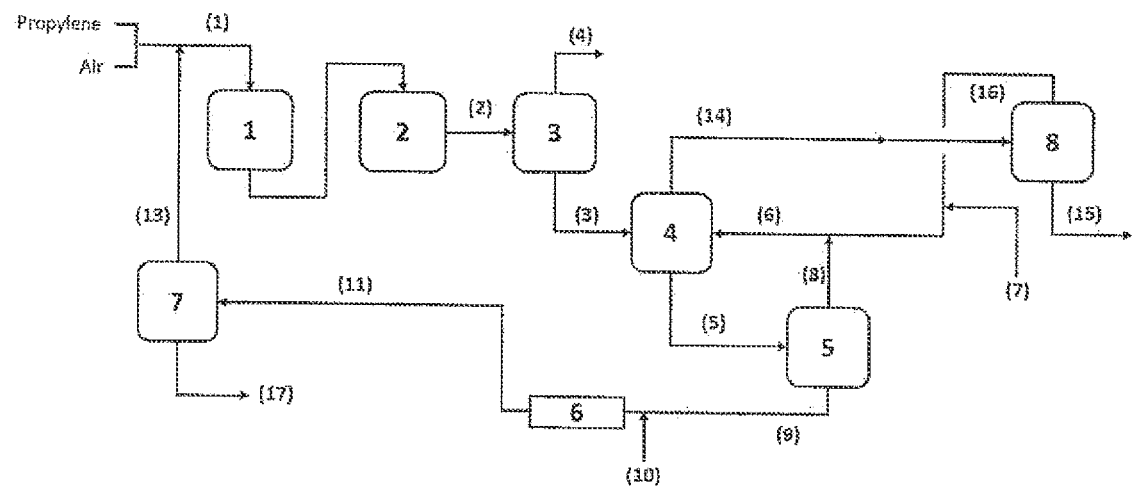
[Fig. 2]
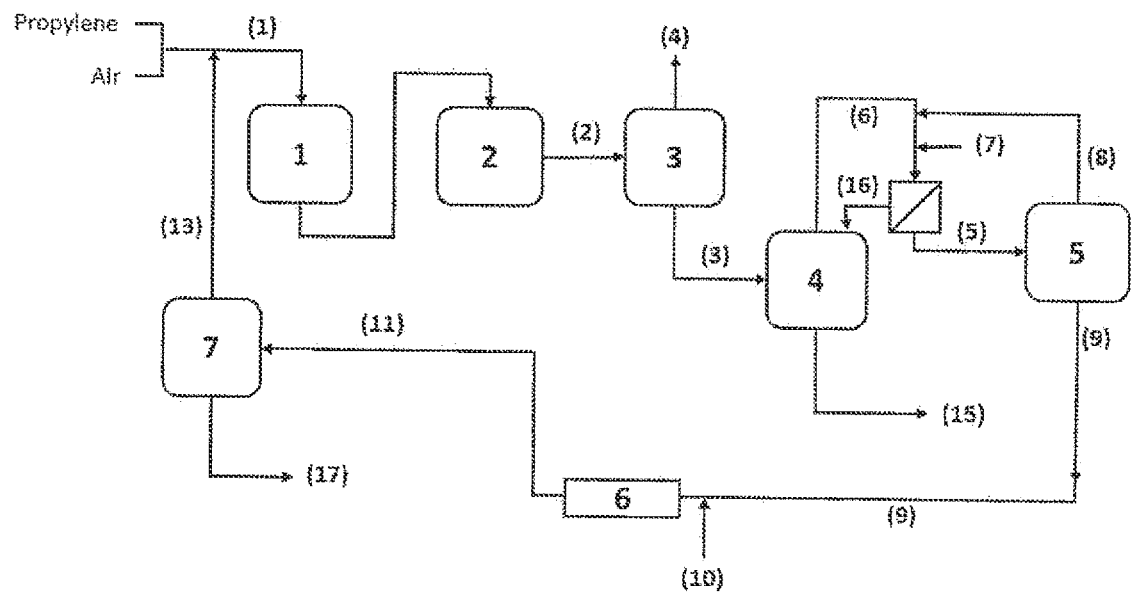

ELIMINATION OF FORMALDEHYDE IN WASTEWATER THROUGH OXIDATION TREATMENT

CROSS-REFERENCE TO RELATED APPLICATIONS

This application is a national stage application under 35 U.S.C. § 371 of PCT/FR2020/051477, filed Aug. 18, 2020 which claims benefit to application FR19.09477, filed Aug. 28, 2019.

FIELD OF THE INVENTION

The present invention relates to a process for the treatment of wastewater containing formaldehyde. In particular, the invention relates to a process for the treatment of liquid effluents resulting from the manufacture of acrylic acid, which is targeted at removing the formaldehyde present in these effluents. The invention also relates to the use of the purified aqueous solution thus obtained for treatment before discharge into the natural environment. The invention also relates to the recycling of the effluent freed from the majority of formaldehyde in a process for the production of acrylic acid by catalytic oxidation of propylene and/or propane.

TECHNICAL BACKGROUND

The processes for the manufacture of acrylic acid from propylene and/or propane generate formaldehyde as by-product of the catalytic oxidation reaction. In addition, these processes produce a large amount of water (at least one mole of water per mole of propylene converted). Formaldehyde is a light impurity (gas at ambient temperature) which is very soluble in water, forming a hydrate making it difficult to separate it from its aqueous solutions. Thus, the wastewater streams generated during the stages of recovery and purification of acrylic acid generally contain formaldehyde as predominant organic impurity.

Formaldehyde levels and emissions are subject to strict regulations. Plants operating with formaldehyde must comply with emission regulations which limit the concentration of formaldehyde in residual gases and also in aqueous discharges.

Before final discharge into the natural environment, wastewater must be treated to remove organic impurities therein. The processes used are generally expensive in terms of capital cost and of consumption of reactants. Industrial wastewater is generally sent as final stage to a biological treatment unit before being discharged into the environment. However, formaldehyde is toxic to living organisms, inhibiting the physiological activity of cells. Wastewater containing formaldehyde at high concentration is therefore toxic to microorganisms. The paper "A method for treating wastewater containing formaldehyde" (H. R. Lotfy et al., Water Research, 36 (2002), 633-637) describes that the biological treatment process is virtually completely inhibited when the formaldehyde concentration exceeds 300 mg/l. Therefore, the formaldehyde concentration must be significantly reduced before biological treatment of wastewater.

The gas-phase catalytic oxidation reactions involved during the manufacture of acrylic acid from propylene and/or propane require that these raw materials be introduced in dilute form. As these reactions are highly exothermic, the reckless increase in the concentration of reactants with a view to improving the productivity of the process comes up against the problems of the difficulty of removing the heat generated and its corollary a significant loss of selectivity, and of the risk of explosion wider conditions of too high a concentration of reactants. Thus, the concentration of propylene in the mixture feeding the reactor is usually between 5% and 15% by volume. Dilution is usually ensured by nitrogen, accompanying the air introduced as source of oxygen and steam, which is furthermore necessary in order to limit the formation of carbon oxides by combustion and to ensure good desorption of the reactive entities on the catalyst. In order to obtain sufficient dilution of the reactants in the gas mixture feeding the reactor, necessary for a controlled and selective reaction, an economical process for the production of acrylic acid consists in using a part of the wastewater from the factory, after vaporization, as gaseous diluent for the propylene and/or propane. This makes it possible to use the water generated by this reaction (generating one mole of water per mole of propylene converted) and thus to avoid resorting to addition of water of external origin. During the stage of vaporization of the water containing this impurity for the purpose of obtaining steam intended for the dilution of the propylene, most of the formaldehyde is entrained with the water in feeding the reactor for oxidation of propylene.

However, formaldehyde is a poison for the reactions for the manufacture of acrylic acid and the intermediate, acrolein, by catalytic oxidation of propylene and/or propane. Thus, in a unit for the production of acrylic acid, the formaldehyde present in the top stream of the steam generators and recycled as feed to the reactors can cause, a loss in acrylic acid yield, due to the deactivation of the catalysts.

Besides the harmful impact of formaldehyde on the catalysts, this impurity is also directly implicated in the fouling of steam generators, as it forms a phenol-formaldehyde polymer called Novolac with hydroquinone, in the presence of acidic entities, such as maleic acid.

Many processes have been proposed for removing formaldehyde in aqueous effluents.

Pretreatment methods using chemical treatments by addition of third compounds can be employed, consisting in forming adducts with formaldehyde which are more easily separable from the aqueous medium, by distillation or by absorption on resins.

For example, studies have been conducted by Chen Yu et al. (International Conference on Challenge in Environmental Science and Computer Engineering, 2010) on the removal of formaldehyde after reaction with sodium bisulfite. R. Kowacs et al. describe a method by treatment in sodium sulfite and metabisulfite medium which shows the great complexity of the reactions, in the paper "Complex Behavior in the Formaldehyde-Sulfite Reaction" (J. Phys. Chem. A. 2005, 109, 283-288).

A similar example can be found in the document U.S. Pat. No. 5,545,336, which describes a process for removing formaldehyde with sodium pyrosulfite which exhibits the additional advantage of not generating sulfur dioxide in an acidic environment. On the other hand, the treatment described is carried out under higher pH conditions (between 6 and 11) than the wastewater streams generally generated by processes for the manufacture of acrylic acid (pH of between 1.5 and 4) and for this reason requires an addition of buffer mixture. In addition, it generates a salt which must be removed, which makes the process complicated.

These methods are relatively complex and are not satisfactory, either because they are expensive, or because they generate streams containing reactants which have to be removed, or also because they generate by-products or deposits of solids which are troublesome.

It is also possible to apply chemical oxidation processes in order to destroy the formaldehyde. The simplest and very commonly used advanced oxidation process is the Fenton process, involving hydrogen peroxide as oxidizing agent, in the presence of a catalyst, generally based on Fe(II). However this process generates an exothermic reaction which prohibits its use on a hot wastewater stream and generates a significant solid deposit which requires frequent cleaning operations.

Consequently, to date, there exists a need to efficiently treat, by economical processes, acidic aqueous effluents originating from processes for the manufacture of acrylic acid and containing formaldehyde in high concentration.

In order to solve this problem, the invention provides a process for the removal of formaldehyde in wastewater originating from the manufacture of acrylic acid from propylene and/or propane, said process being based on the oxidation of formaldehyde using hydrogen peroxide, in the absence of catalyst.

SUMMARY OF THE INVENTION

The invention relates first to a process for the removal of formaldehyde in wastewater originating from the manufacture of acrylic acid or acrolein, said process being carried out in a plant comprising a reaction section and a vaporization section, said process comprising the following stages:
  i. treating the wastewater with hydrogen peroxide in the reaction section,
  ii. transferring the treated wastewater to the vaporization section, and
  iii. carrying out a partial vaporization of the treated wastewater, generating a top stream and a bottom stream, the top and bottom streams each having a formaldehyde concentration of less than 1% by weight.

According to one embodiment, the wastewater to be treated contains from 0.5% to 5%, preferably from 0.5% to 2.5%, by weight of formaldehyde.

According to one embodiment, the molar ratio of the hydrogen peroxide to the formaldehyde varies from 0.1/1 to 3/1.

According to one embodiment, the hydrogen peroxide is introduced into the reaction section in aqueous form.

The invention is also targeted at providing a process for the synthesis of acrylic acid by catalytic oxidation of propylene and/or propane, in which the aqueous phase containing formaldehyde is treated with hydrogen peroxide, making it possible to obtain, on the one hand, a gaseous aqueous stream, which will be recycled to the stage of oxidation of propylene and/or propane, and, on the other hand, a liquid aqueous stream frees from the hulk of the formaldehyde, which thus becomes capable of being discharged into the natural environment, after treatment intended to remove the other organic products.

The present invention makes it possible to overcome the disadvantages of the state of the art. More particularly, it provides a simple, economical and effective treatment method for removing formaldehyde in wastewater resulting from a process for the manufacture of acrylic acid. In addition, this method makes it possible to avoid the loss in yield of the reactions for the oxidation of propylene and/or propane by recycling a stream concentrated in formaldehyde.

The process according to the invention can also be used to reduce the concentration of formaldehyde in wastewater from the manufacture of (meth)acrylic monomers containing this impurity which are intended to be treated before discharge into the external environment, for example by biological treatment or incineration.

The process according to the invention does not generate new products or solids.

The reaction is not exothermic. Thus, the stream of wastewater originating from the process for the manufacture of acrylic acid, generally obtained at the bottom of a distillation column (stream 9 of FIGS. 1 and 2 described below), thus at high temperature, does not require precooling before reaction, then heating for the purpose of carrying out the following vaporization stage.

The reaction can be carried out in a restricted reaction volume which thus allows continuous treatment in a tubular reactor of static mixer type, which reduces the capital costs compared to a conventional reactor.

FIGURES

FIG. 1 represents the diagram of a plant for the production of acrylic acid employing the process of the invention according to one embodiment.

FIG. 2 represents the diagram of an alternative form of the plant for the production of acrylic acid employing the process of the invention according to another embodiment.

DESCRIPTION OF EMBODIMENTS OF THE INVENTION

The invention is now described in more detail and in a nonlimiting way in the description which follows.

According to a first aspect, the invention relates to a process for the removal of formaldehyde in wastewater originating from the manufacture of acrylic acid or acrolein, said process being carried out in a plant comprising a reaction section and a vaporization section, said process comprising the following stages:
  i. treating the wastewater with hydrogen peroxide in the reaction section,
  ii. transferring the treated wastewater to the vaporization section, and
  iii. carrying out a partial vaporization of the treated wastewater, generating a top stream and a bottom stream, the top and bottom streams each having a formaldehyde concentration of less than 1% by weight.

According to various embodiments, said process comprises the following features, if appropriate combined.

According to one embodiment, the manufacture of acrylic acid or acrolein is carried out by catalytic oxidation of propylene and/or propane.

According to one embodiment, the wastewater to be treated contains from 0.5% to 5%, preferably from 0.5% to 2.5%, by weight of formaldehyde.

According to one embodiment, said wastewater comprises a mixture of acrylic acid, acetic acid, maleic acid and formic acid and has a pH of 1 to 3.

According to one embodiment, the molar ratio of the hydrogen peroxide to the formaldehyde varies from 0.1/1 to 3/1, preferably from 0.3/1 to 1/1.

According to one embodiment, the hydrogen peroxide is introduced into the reaction section in aqueous form. The solution employed has a concentration of 20% to 70% by weight of hydrogen peroxide, preferably of 30% to 70%.

Stage i) can be carried out batchwise or continuously. Preferably, the treatment of the wastewater with hydrogen peroxide in the reaction section takes place continuously.

Stage i) can be carried out under an absolute pressure of between 900 Pa and 1300 Pa. Preferably, the treatment of the wastewater with hydrogen peroxide in the reaction section takes place under an absolute pressure of 900 Pa to 1100 Pa.

The reaction temperature during stage i) can vary from 20 to 110° C. Preferably, the oxidation reaction takes place at a temperature of greater than 60° C., in particular between 75 and 105° C. Advantageously, the stream of wastewater originating from the process for the manufacture of acrylic, acid, generally obtained at the bottom of a distillation column, thus at high temperature, it does not require substantial precooling before reaction, namely not a decrease in temperature of greater than 10° C.

The contacting of the hydrogen peroxide with the wastewater to be treated can vary between 2 minutes and 2 h, and preferably it is between 2 and 10 minutes.

The reaction section can be made of one or more stirred reactors in series. Any type of reactor making it possible to ensure good contact between the aqueous stream to be treated and the hydrogen peroxide reactant can be used, such as, for example, a reactor provided with a stirrer or with recirculation via a pump. According to one embodiment, the reactor can be a tubular reactor of static mixer type, or a heat exchanger in which the medium flows in a turbulent manner, additionally providing slight cooling, or a combination of these types of reactors.

The Wastewater treated with hydrogen peroxide is sent after this period of time to the vaporization section.

According to one embodiment, the rate of vaporization in stage iii) is from 30% to 95%, preferably from 50% to 90%.

Stage iii) can be carried out at atmospheric pressure or under excess pressure. The steam produced is intended to be recycled as feed for the reaction section, which comprises two reaction zones in series (oxidation of propylene to give acrolein, then of acrolein to give acrylic acid). As the solid catalysts contained in these two reaction zones create an added pressure drop, the gaseous reactants must feed the first reaction zone under sufficient pressure. Preferably, the partial vaporization of the treated wastewater takes place under a pressure slightly greater than that of the reactants feeding the first reaction zone, namely an absolute pressure located between 2000 and 2700 Pa. According to another possible embodiment, the vaporization can be carried out at a lower pressure, for example at an absolute pressure of between atmospheric pressure and 1300 Pa, and the steam is subsequently compressed to reach an absolute pressure located between 2000 and 2700 Pa.

This vaporization stage can be carried out in any type of item of equipment known to a person skilled in the art which generates steam from a liquid aqueous stream. For example, the steam generator could consist of a vessel equipped with recirculation of the liquid through an external heat exchanger through which circulates a heat-transfer fluid (steam or thermal oil), or more simply with a heat exchanger with a tube bundle arranged inside a casing, through which circulates a heat-transfer fluid. The item of vaporization equipment can also be provided with internal separation elements, such as trays or packing. The residence time in the item of vaporization equipment does not significantly impact the performance qualities of the process.

On conclusion of stage iii), a top stream and a bottom stream are obtained, the top and bottom streams each having a formaldehyde concentration of less than 1% by weight.

According to one embodiment, the top stream has a formaldehyde concentration by weight of less than 0.6%.

According to one embodiment, the bottom stream has a formaldehyde concentration by weight of less than 0.3%.

In the case of a process for the synthesis of acrylic acid by catalytic oxidation of propylene and/or propane, said top stream is recycled to the stage of oxidation of the propylene and/or propane. The substantial decrease in the concentration of formaldehyde in the recycled stream makes it possible to avoid the loss in yield of the reactions for the catalytic oxidation of propylene and/or propane.

The bottom stream contains less than 1%, indeed even less than 0.3%, by weight of formaldehyde, i.e. a decrease in the concentration of formaldehyde between the feed stream and the bottom stream of approximately 80%. This makes it capable of being subjected to biological treatment or to treatment by incineration, before discharge into the natural environment.

Advantageously, the process according to the invention does not generate new products or solids.

The invention also relates to a process for the synthesis of acrylic acid by catalytic oxidation of propylene and/or propane, said process comprising the treatment by oxidation of an aqueous phase containing formaldehyde, with hydrogen peroxide, in a reaction section, the transfer of the mixture thus formed into a vaporization section so as to obtain, at the top, a gaseous aqueous stream having a formaldehyde concentration of less than 1% by weight, which is recycled to the stage of oxidation of propylene and/or propane, and, at the bottom, a liquid aqueous stream having a formaldehyde concentration of less than 1% by weight, indeed even of less than 0.3% by weight. Advantageously, said liquid aqueous stream is discharged into the natural environment, after biological treatment or treatment by incineration.

Advantageously, the process for removing formaldehyde in the wastewater originating from the manufacture of acrylic acid, according to the invention, does not employ a catalyst. When this process was applied to wastewater originating from the manufacture of acrylic acid, in the presence of iron(II) ions, it was found that the concentration of formaldehyde in the top stream remains very high (greater than 1% by weight) (comparative example 12).

According to a preferred embodiment, the process according to the invention is implemented using a plant represented in FIGS. 1 and 2.

With reference to FIGS. 1 and 2, a plant for the production of acrylic acid comprises a first reactor 1 fed with a mixture (1) of propylene and/or propane and of oxygen, in which a mixture rich in acrolein is produced and sent to a second reactor 2, where the selective oxidation of the acrolein to give acrylic acid is carried out.

The gas mixture (2) resulting from the second stage consists, apart from the acrylic acid, of unconverted compounds resulting from the reactants involved or of impurities generated during one at least of the two reaction stages, namely:

light compounds which are noncondensable under the temperature and pressure, conditions normally employed, i.e. essentially: propylene, propane, nitrogen, unconverted oxygen, carbon monoxide and dioxide formed in small amounts by final oxidation;

light compounds which are condensable, i.e. essentially: water, light aldehydes, such as unconverted acrolein, formaldehyde and acetaldehyde, formic acid, acetic acid or propionic acid;

heavy compounds: i.e. in particular furfuraldehyde, benzaldehyde, maleic acid and anhydride, or benzoic acid.

The complexity of the gas mixture (2) obtained in this process means that a set of operations is needed to recover the acrylic acid present in this gaseous effluent and convert it into an acrylic acid grade compatible with its final use.

To this end, the gas mixture (2) is sent to an absorption column 3, where the acrylic acid and other oxidation products are condensed by absorption with water, a stream (4) of noncondensable compounds being removed.

The liquid stream (3) exiting from the absorption column 3 is subjected to a dehydration stage, which is carried out in the presence of a water-immiscible solvent (7) for acrylic acid, in a unit 4.

In a first alternative form, represented in FIG. 1, the dehydration stage is carried out by liquid-liquid extraction of the acrylic acid in the presence of the solvent (7) in a liquid extraction column 4, generating a bottom stream (5) containing water and impurities, including formaldehyde, and a top stream (14) rich in acrylic acid in the solvent medium. Mention may be made, as solvents which can be used, for example, of ethyl acrylate or isopropyl acetate.

The stream (14) is subsequently subjected to a distillation 8 in order to recover the solvent (16), which is recycled via the stream (6) in the extraction column 4, the stream (15) at the bottom being subjected to a purification section (not described in FIG. 1) for the purpose of obtaining technical grade acrylic acid, after removal of the light impurities and heavy impurities.

The aqueous stream (5), containing a small amount of dissolved solvent, is advantageously sent to a stage of recovery of solvent by distillation in a column 5; the solvent is recovered at the top (8) and recycled in the stream (6) feeding the unit 4, and an aqueous phase containing the bulk of the formaldehyde is obtained at the bottom (9).

The process according to the invention consists in treating the aqueous phase (9) by addition of hydrogen peroxide in a reaction section 6 and sending the mixture thus formed (11) into a vaporization section 7, so as to obtain, at the top, a gaseous aqueous stream (13) containing little formaldehyde, which is recycled to the stage of oxidation reaction of propylene and/or propane, and, at the bottom, a liquid aqueous stream (17) also freed from the bulk of the formaldehyde. The stream (17) is subsequently treated so as to remove the bulk of the organic products which it contains, before discharge into the natural environment, for example by incineration or by biological treatment.

In a second alternative form, represented in FIG. 2, the dehydration stage is carried out by azeotropic distillation with a solvent (7) in a distillation column 4, producing a two-phase medium (6) at the column top: an organic phase (16) consisting essentially of the solvent, which is recycled as reflux in the column 4, and an aqueous phase (5) containing impurities, including formaldehyde. Mention may be made, as solvents which can be used, for example, of methyl isobutyl ketone (MIBK) or toluene.

At the bottom of the azeotropic distillation column, the stream (15) is subjected to a purification section (not described in FIG. 2) for the purpose of obtaining technical grade acrylic acid, after removal of the light impurities and heavy impurities.

Other stages, not represented in FIGS. 1 and 2, can be present in the section for purification of the acrylic acid.

EXAMPLES

The following examples illustrate the invention without limiting it.

Example 1 (Comparative)

In a unit for the production of acrylic acid according to the diagram of FIG. 1 without the addition of hydrogen peroxide, the stream (9) of wastewater feeding the vaporizer contains 2.2% of formaldehyde and the vaporization rate of this mixture is 75%.

An aqueous mixture representative of the stream of wastewater from the factory is prepared, consisting of 2.31% of formaldehyde, 0.6% of acrylic acid, 2.3% of acetic acid, 0.21% of maleic acid and 0.26% of formic acid, the remainder being water. This mixture is vaporized under atmospheric pressure in a rotary evaporator. After having vaporized 75% of this mixture, a top stream is obtained containing 2.55% of formaldehyde, the remainder of the unvaporized formaldehyde representing a concentration of 1.55% by weight.

Examples 2 to 10

An aqueous mixture representative of the stream of wastewater from the factory is prepared, consisting of formaldehyde at a concentration of between 1% and 2.3%, and also of 0.6% of acrylic acid, 2.3% of acetic acid, 0.2% of maleic acid and 0.25% of formic acid, the remainder being water. This mixture is introduced by a pump into a stirred glass reactor, at the same time as a 39% aqueous hydrogen peroxide solution, introduced by virtue of a second pump. The stirred reactor has a jacket through which circulates a thermal fluid at controlled temperature. The flow rate of the mixture of the two streams is controlled so as to ensure a residence time in the reactor of 5 min to 60 min. The initial temperature in the reactor is between 20° C. and 80° C. On conclusion of the reaction stage, the reaction mixture is collected and an amount of 150 g to 200 g of this mixture is subjected to vaporization under atmospheric pressure in a laboratory rotary evaporator. The vaporization rate (ratio by weight of distillate stream to the feed stream) is between 69% and 78%.

The operating conditions of the tests and analyses of the streams obtained are shown in table 1 below. No significant increase in temperature was observed during the course of these tests. In all the cases tested, the reaction mixture remained clear, without precipitation of solid. Likewise, on conclusion of the vaporization stage, no solid precipitation is observed.

TABLE 1

| | | Test number | | | | | | | | |
| --- | --- | --- | --- | --- | --- | --- | --- | --- | --- | --- |
| | Unit | 2 | 3 | 4 | 5 | 6 | 7 | 8 | 9 | 10 |
| Reaction residence tme | min | 60 | | | | | 10 | | 5 | |
| Reaction temperature | ° C. | 21 | 77 | 75 | 75 | 80 | 78 | 78 | 74 | 76 |
| HCHO concentration in the wastewater | % wt | 2.3% | 2.3% | 1.2% | 1.2% | 2.3% | 1.0% | 1.0% | 1.0% | 1.0% |
| $H_2O_2$/HCHO ratio | mol/mol | 0.55 | 0.55 | 1.93 | 0.32 | 0.69 | 0.69 | 0.30 | 0.40 | 0.29 |
| Vaporization ratio (top/feed) | % wt | 78% | 72% | 71% | 71% | 69% | 72% | 87% | 71% | 71% |
| HCHO concentration at top | % wt | 0.34% | 0.13% | 0.04% | 0.57% | 0.15% | 0.13% | 0.47% | 0.28% | 0.48% |

TABLE 1-continued

| | | Test number | | | | | | | | |
|---|---|---|---|---|---|---|---|---|---|---|
| | Unit | 2 | 3 | 4 | 5 | 6 | 7 | 8 | 9 | 10 |
| HCHO concentration at bottom | % wt | | | | 0.12% | 0.12% | 0.19% | 0.22% | 0.07% | 0.10% |
| HCHO removal yield at top[1] | % wt | 89% | 96% | 97% | 85% | 94% | 88% | 57% | 74% | 56% |
| HCHO removal rate at bottom[2] | % wt | | | | 90% | 95% | 81% | 78% | 93% | 90% |

[1]becomes: reduction in the amount of formaldehyde entrained at the top with H2O2 treatment, versus without treatment, at the same vaporization ratio
[2]becomes: decrease in the HCHO concentration between the feed stream and the bottom stream The complete analysis of the streams generated by the oxidation reaction does not indicate any new product compared to the products initially present in the wastewater mixture.

These tests show that the process according to the invention makes it possible to remove the bulk of the formaldehyde present in the wastewater, generating, by vaporization, a stream in which the concentration of this impurity is very markedly reduced, without generating solid deposit or new product. The very rapid processing kinetics make it possible to carry out the reaction continuously with a very low residence time, thus reducing the reaction volume required. For this reason, the reactor can be a simple tubular mixer reactor; for example of static mixer type, thus limiting the capital costs. In addition, the treatment can be carried, out on a hot wastewater stream originating from a column bottom, without having recourse to precooling.

Example 11 (Comparative)

The same aqueous mixture representative of the stream of wastewater from the factory is prepared, in which the formaldehyde concentration is 2.3%. 11.4% of iron(II) sulfate monohydrate is dissolved in this mixture and the mixture is then introduced into the stirred reactor described above, at a flow rate of 235 g/h, at the same time as a 39% aqueous hydrogen peroxide solution. The molar ratio of hydrogen peroxide with respect to the formaldehyde initially present is 1.2/1 and that of iron(II) sulfate with respect to the hydrogen peroxide is 0.4/1. The residence time in the reactor is 60 min. The initial reaction temperature is 22° C. After 4 hours of reaction under these conditions, the temperature of the reaction mixture reaches 60° C. and a yellowish solid deposit accumulates on the wall of the reactor. On conclusion of the reaction stage, the reaction mixture is filtered and an amount of 203 g of this mixture is subjected to vaporization under atmospheric pressure in a laboratory rotary evaporator. The targeted vaporization rate (ratio by weight of distillate stream to the feed stream) is 70%.

The concentration of formaldehyde in the distilled stream is 1.57%.

The invention claimed is:

1. A process for the removal of formaldehyde in wastewater originating from the manufacture of acrylic acid or acrolein, said process being carried out in a plant comprising a reaction section and a vaporization section, said process comprising the following stages:
  i. treating the wastewater with hydrogen peroxide in the reaction section,
  ii. transferring the treated wastewater to the vaporization section, and
  iii. carrying out a partial vaporization of the treated wastewater, generating a top stream and a bottom stream, these streams respectively having a concentration by weight of formaldehyde of less than 1% in the top flow and of less than 1% in the bottom flow.

2. The process as claimed in claim 1, in which the wastewater to be treated contains from 0.5% to 5% by weight of formaldehyde.

3. The process as claimed in claim 1, in which said wastewater comprises a mixture of acrylic acid, acetic acid, maleic acid and formic acid and has a pH of 1 to 3.

4. The process as claimed in claim 1, in which the molar ratio of the hydrogen peroxide to the formaldehyde varies from 0.1/1 to 3/1.

5. The process as claimed in claim 1 in which the hydrogen peroxide is introduced into the reaction section in aqueous form.

6. The process as claimed in claim 1 in which stage i) is carried out batchwise or continuously.

7. The process as claimed in claim 1 in which stage i) is carried out under an absolute pressure of between 900 and 1300 Pa.

8. The process as claimed in claim 1 in which the reaction temperature of stage i) is from 20 to 110° C.

9. The process as claimed in claim 1 in which the reaction time of stage i) is from 2 minutes to 2 h.

10. The process as claimed in claim 1 in which the vaporization rate in stage iii) is from 30% to 95%.

11. The process as claimed in claim 1 in which stage iii) takes place under an absolute pressure of 2000 Pa to 2700 Pa.

12. The process as claimed in claim 1 in which the wastewater containing formaldehyde results from a process for the synthesis of acrylic acid by catalytic oxidation of propylene and/or propane.

13. The process as claimed in claim 1 in which the bottom stream generated in stage iii) is subjected to a biological treatment or to treatment by incineration, before discharge into the natural environment.

14. A process for the synthesis of acrylic acid by catalytic oxidation of propylene and/or propane, said process comprising the treatment of the wastewater resulting therefrom by the process claimed in claim 1.

15. The process as claimed in claim 14, in which said liquid aqueous stream is discharged into the natural environment, after biological treatment or treatment by incineration.

* * * * *